(12) United States Patent
Ohkubo

(10) Patent No.: US 6,543,841 B1
(45) Date of Patent: Apr. 8, 2003

(54) VEHICLE ROOF STRUCTURE

(75) Inventor: Hiroshi Ohkubo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/209,031

(22) Filed: Jul. 30, 2002

(30) Foreign Application Priority Data

Oct. 4, 2001 (JP) ........................................ 2001-309156

(51) Int. Cl.⁷ .................................................. B60J 7/16
(52) U.S. Cl. ........................................ 296/210; 296/102
(58) Field of Search ............................. 296/210, 102, 296/99.1, 181, 185

(56) References Cited

U.S. PATENT DOCUMENTS 1,696,937 A * 1/1929 Breneman ................... 296/210
4,311,744 A * 1/1982 Watanabe ................ 296/210 X
4,601,511 A * 7/1986 Nakamura et al. .......... 296/210
5,681,076 A * 10/1997 Yoshii ........................ 296/210
6,299,243 B1 * 10/2001 Gerald, Sr. ................. 296/210

FOREIGN PATENT DOCUMENTS

| CA | 612291 | * | 1/1961 | ................. 296/210 |
| EP | 0178858 | * | 4/1986 | ................. 296/210 |
| GB | 286664 | * | 6/1928 | ................. 296/210 |
| JP | 8-113161 | | 10/1997 | |
| SU | 1601011 | * | 10/1990 | ................. 296/210 |

* cited by examiner

Primary Examiner—Joseph D. Pape
(74) Attorney, Agent, or Firm—Merchant & Gould P.C.

(57) ABSTRACT

In a vehicle roof structure of an automobile, a front part of a roof panel is formed into an arch configuration which declines gradually while a rear part of the roof panel is formed flat. Stiffeners, each of which has a U-shaped cross section, are provided on the rear part of the roof panel, side edge portions of each of the stiffeners are folded back.

4 Claims, 2 Drawing Sheets

VEHICLE ROOF STRUCTURE

BACKGROUND OF THE INVENTION

1. Field of the Invention

The present invention relates to a vehicle roof structure, and more particularly to a vehicle roof structure which can secure a wide space inside a passenger compartment while improving the rigidity thereof.

2. Description of the Related Art

As is known, it is an inevitable problem that the rigidity of a roof portion of a vehicle such as an automobile declines because the roof portion has a relatively wide area.

To cope with this problem, a structure has conventionally been adopted in which reinforcements each having a U-shaped cross section are disposed on a passenger compartment side of a roof panel so that the roof panel is supported from a back side thereof by flange portions formed along side edge portions of the reinforcements. End portions of the reinforcements are supported by roof side rails which supports the sides of the roof portion together with the roof panel, whereby the surface rigidity of the roof portion is enhanced. A structure of this type is disclosed in, for example, JP-A-08-113161.

With the prior art vehicle roof structure, however, the vertical walls of the reinforcements need to be taller in order to increase the bending rigidity of the reinforcements themselves so that the surface rigidity of the entirety of the roof portion is secured by the reinforcements and as a result, there is caused a problem that the vertical dimension of the passenger compartment is reduced by such an extent that the height of the vertical walls is increased to thereby narrow the space inside the passenger compartment.

In addition, it may be considered to increase the thickness of the reinforcements in order to increase the rigidity thereof without increasing the height of the vertical walls, but this leads to another problem that the vehicle weight is increased.

SUMMARY OF THE INVENTION

To cope with the problems, an object of the invention is to provide a vehicle roof structure which can increase the rigidity thereof without sacrificing the space inside the passenger compartment.

With a view to attaining the object, according to a first aspect of the invention, there is provided a vehicle roof structure characterized in that a front part of a roof panel (for example, a roof panel 8 in an embodiment) is formed into an arch configuration which declines gradually while a rear part of the roof panel is formed flat and in that stiffeners (for example, stiffeners 9 in the embodiment) each having a U-shaped cross section are provided on the rear part of the roof panel, terminal ends of each stiffener being folded back.

By providing the vehicle roof structure accordingly, it is possible to increase the rigidity of the roof panel at the front part thereof by forming the arch configuration which is advantageous in providing the rigidity and at the flat rear part thereof by the stiffeners whose terminal ends are folded back.

According to a second aspect of the invention, there is provided a vehicle roof structure as set forth in the first aspect of the invention, wherein the stiffeners are disposed on a passenger compartment side of the roof panel in a transverse direction, and wherein end portions (for example, left and right attaching portions 26, 27 in the embodiment) of the stiffeners are attached to vehicle body frames (for example, left and right frames 5, 6 in the embodiment) which support side edges (for example, left and right attaching flanges 14, 15 in the embodiment) of the roof panel.

By providing the vehicle roof structure accordingly, a load exerted on the stiffeners from the roof panel is securely distributed to the vehicle body frame from the stiffeners whose rigidities are secured.

According to a third aspect of the invention, there is provided a vehicle roof structure as set forth in the first or second aspect of the invention, wherein horizontally extending flange portions (for example, flange portions 18 in the embodiment) are formed at upper edges of vertical walls (for example, vertical walls 17 in the embodiment) of each of the stiffeners as roof supporting portions, and wherein folded-back portions (for example, folded-back portions 20 in the embodiment) which are bent along the vertical walls are formed along side edge portions of the flange portions.

By providing the vehicle roof structure accordingly, when the roof panel attempts to deform in an out-of-plane fashion due to vibrations caused while the vehicle is running, while a load is exerted on the stiffeners in a bending direction, the vertical walls and folded-back portions of the stiffeners both receive the load in an inplane direction.

DETAILED DESCRIPTION OF THE PREFERRED EMBODIMENTS

Figure 1:
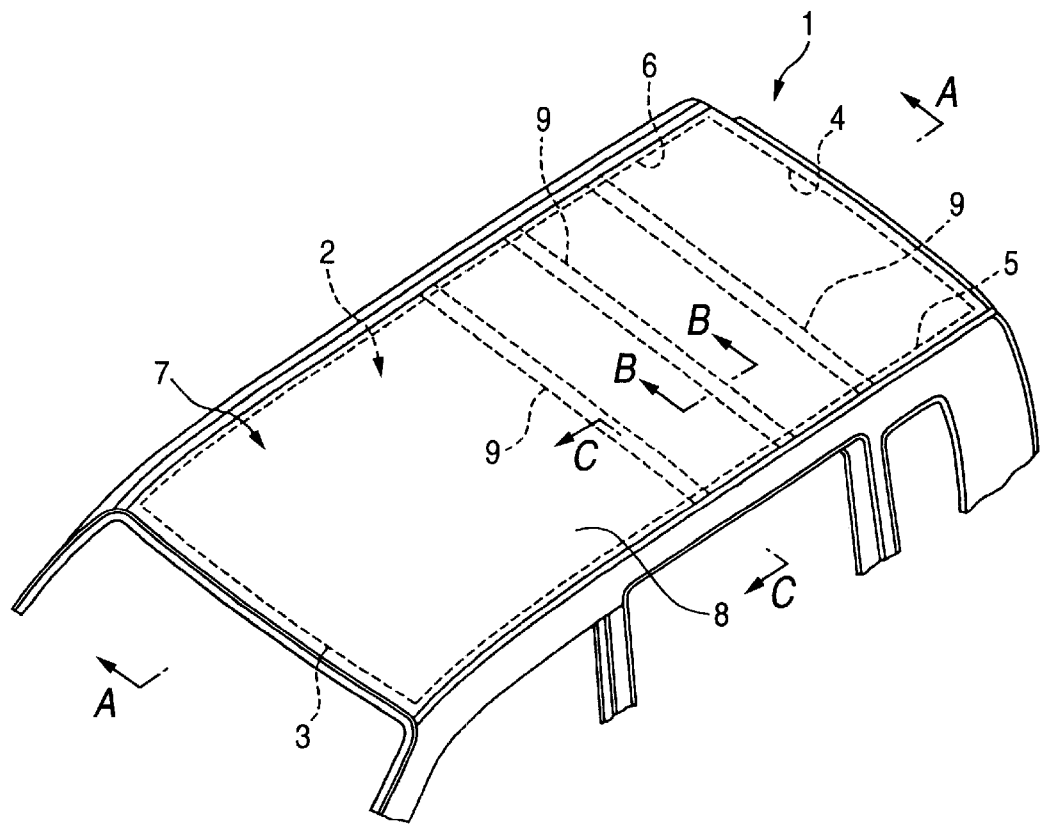
FIG. 1 is a perspective view of a vehicle body according to an embodiment of the invention.

An embodiment of the invention will be described below in conjunction with the accompanying drawings. FIG. 1 is a perspective view of a vehicle body, FIG. 2 is a sectional view taken along the line A—A in FIG. 1, and FIG. 3 is a partial plan view of FIG. 1.

As shown in FIG. 1, a roof opening 2 is formed in an upper portion of a vehicle body 1, and the roof opening 2 is constituted by front and rear frames 3, 4 which constitute front and rear portion of the opening 2 and left and right frames 5, 6 which constitute side portions of the opening 2. A roof portion 7 is attached to the roof opening 2. Note that the front and rear frames 3, 4 and the left and right frames 5, 6 constitute the vehicle body frame.

Figure 2:
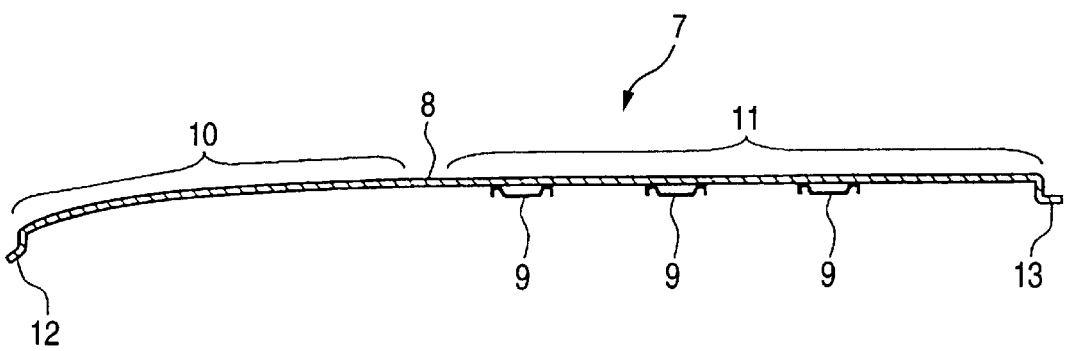
FIG. 2 is a sectional view taken along the line A—A in FIG. 1.
Figure 3:
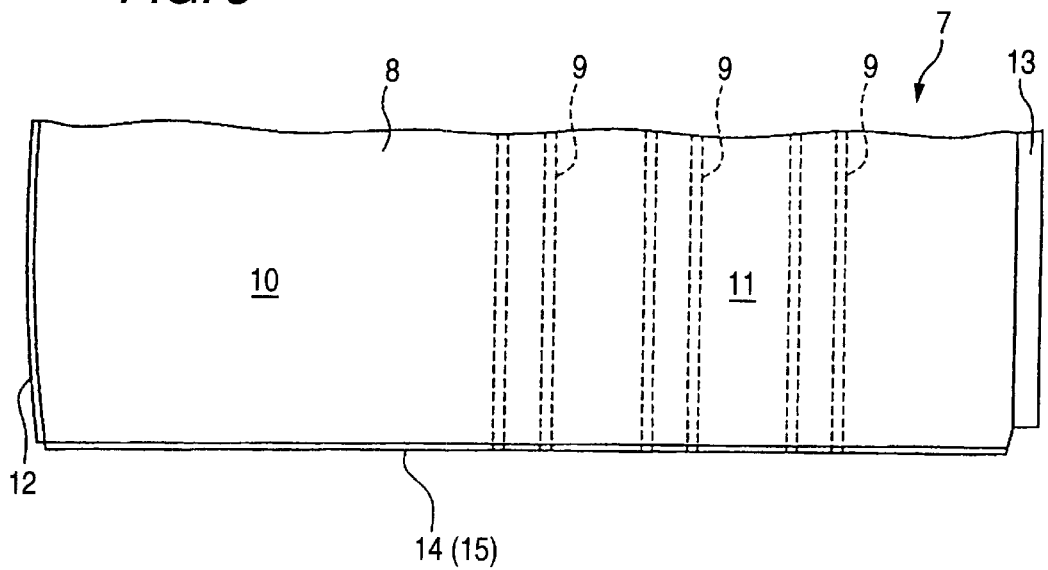
FIG. 3 is a partial plan view of FIG. 1.

As shown in FIGS. 2 and 3, the roof portion 7 comprises a roof panel 8 and stiffeners 9 as reinforcing materials for supporting the roof panel 8 from the inside of the passenger compartment.

An arch portion 10 which exhibits an arch configuration which declines gradually as viewed from the side is formed at a front part of the roof panel 8, and a flat portion 11 which is flat as viewed from the side is formed at a rear part of the roof panel 8. Front and rear attaching flanges 12, 13 are provided at front and rear edges of the roof panel 8, respectively, for connection to the front and rear frames 3, 4, while left and right attaching flanges 14, 15 are provided along left and right side edges of the roof panel 8, respectively, for connection to the left and right frames 5, 6.

Note that the reference numeral 15 for the right attaching flange is described together with the left attaching flange 14 due to limitations to the drawings.

Then, stiffeners 9 extending in a transverse direction and each having a U-shaped cross section are provided at three positions at the rear part of the roof panel 8 on a passenger compartment side thereof, and end portions of the respective stiffeners 9 are attached to the left and right frames 5, 6 which support the side edges of the roof panel 8.

Figure 4:
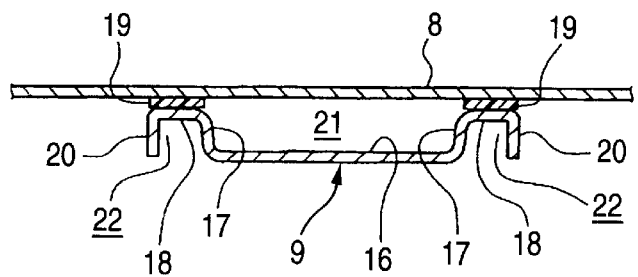
FIG. 4 is an enlarged sectional view taken along the line B—B in FIG. 1.

FIG. 4 is an enlarged sectional view taken along the line B—B in FIG. 1. As shown in the figure, the stiffener 9 is basically a member having a U-shaped cross section which comprises a bottom wall 16 and vertical walls 17 which erect from the bottom wall 16, and the vertical walls 17 are formed relatively short relative to the bottom wall 16. Then, flange portions 18 which extend horizontally are formed at upper edges of the vertical walls 17 as respective roof supporting portions, and an adhesive material 19 such as a sealer is applied to the flange portions 18 for fixing the stiffener 19 to a back side of the roof panel 8. Note that in the event that a certain degree of elasticity is maintained in the sealer after it has set, the sealer is advantageous in that it can support and fix the roof panel 8 elastically.

Side edge portions (terminal ends) of each flange portion 18 are folded back downwardly, whereby folded-back portions 20 are formed which extend downwardly along the vertical walls 17, and the folded-back portions 20 extend as far as the position of the bottom wall 16.

Consequently, a first portion 21 of a U-shaped cross section is formed by the bottom wall 16 and the vertical walls 17, and second portions 22 of a U-shaped cross section are formed before and after the first portion 21 of a U-shaped cross section by the vertical walls 17, the flange portions 18 and the folded-back portion 20.

Figure 5:
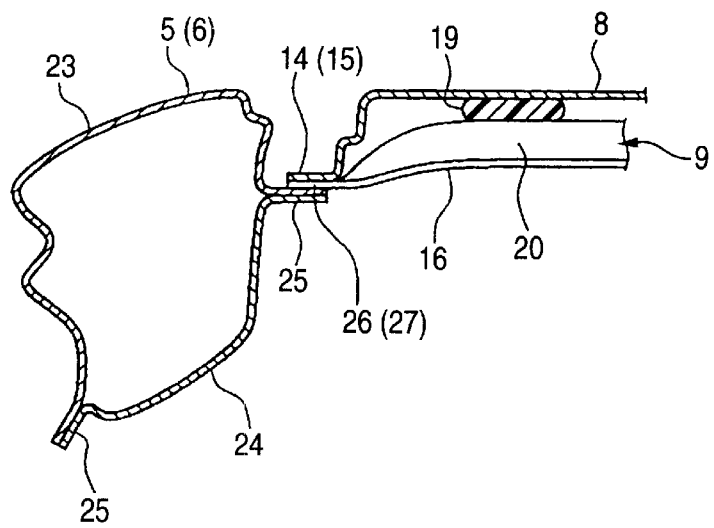
FIG. 5 is a sectional view taken along the line C—C in FIG. 1.

FIG. 5 is a sectional view taken along the line C—C in FIG. 1. As shown in the figure, the left frame 5 is formed into a structure of a closed section in which an outer panel 23 and an inner panel 24 are jointed together at joint flange portions 25 which are inboard and outward of the passenger compartment (this similarly applies to the right frame 6), and the left attaching flange 14 of the roof panel 8 is jointed to the joint flange portion 25 which is inboard of the passenger compartment.

On the other hand, the stiffener 9 is formed such that the vertical walls 17 and the folded-back portions 20 are gradually lowered to be continuously merged into a left attaching portion 26 which is one of end portions of the stiffener 9.

Then, the left attaching portion 26 of the stiffener 9 that is constructed as has been described is jointed to the joint flange portion 25 of the left frame 5, which is inboard of the passenger compartment, in a state in which the left attaching portion 26 is held between the inboard joint flange portion 25 and the left attaching flange 14 of the roof panel 8.

In addition, since a right attaching portion 27 of the stiffener is similarly jointed to a joint flange portion 25 of the right frame 6, which is inboard of the passenger compartment, in a state in which the right attaching portion 27 is held between the inboard joint flange portion 25 and the right attaching flange 15 of the roof panel 8, reference numerals denoting the constituent members on the right-hand side are also described together in FIG. 5 which shows the left-hand side portion of the vehicle roof structure and hence a figure showing the right-hand side portion thereof is omitted.

According to the embodiment, the rigidity of the roof panel 8 can be enhanced by the arch-like configured portion 10 which is formed into an arch configuration which is advantageous in providing a required rigidity at the front part and by the stiffeners 9 each having the folded-back portions 20 formed by folding back the side edge portions of the flange portions 18 formed at the upper edges of the vertical walls 17 at the flat rear part thereof. Consequently, the rigidity of the roof can be enhanced without sacrificing the space inside the passenger compartment by keeping the height of the stiffener as short as possible.

Consequently, when the roof panel 8 attempts to deform in an out-of-plane fashion due to vibrations caused while the vehicle is running, although loads are applied to the stiffeners 9 in the bending direction, the first portion 21 of a U-shaped cross section and the two second portions of a U-shaped cross section which are formed by providing the folded-back portions 20 on the stiffeners 9 can resist the loads so applied. In other words, since both the vertical walls 17 and the folded-back portions 20 can receive the loads in the inplane direction which is advantageous in strength, even in the event that the vertical walls 17 and the folded-back portions 20 are formed shorter, a sufficient rigidity can be secured, and the height of the space inside the passenger compartment can be maintained as high as possible by such an extent that the vertical walls 17 and the folded-back portions 20 can be formed as low as possible.

As a result, since not only can the strength of the roof portion 7 for accumulated snow thereon be enhanced but also the resonance of the roof portion 7 caused by road noise can be restrained, the generation of booming noise occurring in the passenger compartment mainly due to the membrane motion of the roof portion 7 can be suppressed to thereby increase the calmness inside the passenger compartment.

In addition, since the left attaching portion 26 of the stiffener 9 is jointed to the joint flange portion 25 of the left frame 5, which is inboard of the passenger compartment, in a state in which the left attaching portion 26 is held between the inboard joint flange portion 25 and the left attaching flange 14 of the roof panel 8 and similarly to the left attaching portion 26, the right attaching portion 27 is jointed to the joint flange portion 25 of the right frame 6, which is inboard of the passenger compartment, in such a manner that the right attaching portion 27 is held between the inboard joint flange portion 25 and the right attaching flange 15 of the roof panel 8, the required joint can be ensured with a reduced number of constituent components and hence with a reduced weight.

Namely, since the vertical walls 17 and the folded-back portions 20 of the stiffener 9 are formed as short as possible, the stiffener 9 can change its cross-sectional configuration so that it can reasonably merge into the left and right attaching portions 26, 27 as the stiffener 9 extends toward the end portions thereof, and as a result, the stiffeners 9 can be attached directly to the left and right frames without brackets or the like.

Note that the invention is not limited to the embodiment but, for example, the folded-back portions 20 may be bent further to provide further folded-back portions.

As has been described heretofore, according to the first aspect of the invention, since the rigidity of the roof panel can be enhanced at the front part by forming the front part into the arch configuration which is advantageous in providing the required rigidity and at the rear flat part by the stiffeners which are formed into the configurations whose side edge portions are folded back, there is provided an advantage that the stiffeners can be formed as short as possible to thereby increase the rigidity of the roof without sacrificing the space inside the passenger compartment.

According to the second aspect of the invention, since the loads applied from the roof panel to the stiffeners is securely distributed to the vehicle body frame from the stiffeners whose rigidities are secured, there is provided an advantage that not only can the supporting rigidity of the roof be enhanced but also the height of the stiffeners are kept as short as possible, whereby the height of the space inside the passenger compartment can be kept as tall as possible.

According to the third aspect of the invention, since when the roof panel attempts to deform in the out-of-plane direction due to vibrations caused while the vehicle is running, although the loads are applied to the stiffeners in the bending directions, both the vertical walls and the folded-back portions of the stiffeners receive the loads in the inplane direction which is advantageous in strength, there is provided an advantage that the rigidity of the roof can be secured sufficiently even in the event that the vertical walls and the folded-back portions are formed as short as possible, and consequently, not only can the supporting rigidity of the roof be enhanced but also the height of the space inside the passenger compartment can be made as tall as possible.

What is claimed is:

1. A vehicle roof structure comprising:
    a roof panel having a front part formed into an arch configuration which declines gradually toward a front of a vehicle and a rear part formed in a flat shape; and
    at least one stiffener provided on said rear part of said roof panel, said stiffener comprising:
      a base wall;
      a pair of vertical walls vertically extending from edges of said base wall to form a U-shaped cross section in cooperation with said base wall;
      a pair of flange portions horizontally extending at upper edges of said vertical walls, each serving as a roof supporting portion; and
      a pair of folded-back portions bent parallel to said vertical walls at side edge portions of said flange portions.

2. The vehicle roof structure as set forth in claim 1, wherein said stiffener is disposed on a passenger compartment side of said roof panel in a transverse direction of a vehicle, and
    wherein end portions of said stiffener are attached to vehicle body frames which support side edges of said roof panel.

3. A vehicle roof structure comprising:
    a roof panel;
    at least one stiffener attached to a passenger compartment side of said roof panel to extend in a traverse direction of a vehicle, said stiffener including:
      a base wall;
      a pair of vertical walls vertically extending from edges of said base wall to form a U-shaped cross section in cooperation with said base wall;
      a pair of flange portions horizontally extending at upper edges of said vertical walls; and
      a pair of folded-back portions bent parallel to said vertical walls at side edge portions of said flange portions.

4. The vehicle roof structure as set forth in claim 3, wherein said stiffener is attached to said roof panel by a sealer applied between said roof panel and said flange portions.

* * * * *